US007701948B2

(12) United States Patent
Rabie et al.

(10) Patent No.: US 7,701,948 B2
(45) Date of Patent: Apr. 20, 2010

(54) METRO ETHERNET SERVICE ENHANCEMENTS

(75) Inventors: Sameh Rabie, Kanata (CA); Osama Aboul Magd, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1722 days.

(21) Appl. No.: 10/858,076

(22) Filed: Jun. 2, 2004

(65) Prior Publication Data

US 2005/0160180 A1 Jul. 21, 2005

Related U.S. Application Data

(60) Provisional application No. 60/537,744, filed on Jan. 20, 2004.

(51) Int. Cl.
*H04L 12/56* (2006.01)
(52) U.S. Cl. .................................. 370/395.41
(58) Field of Classification Search ............. 370/230.1, 370/231, 235, 389, 392, 395.2, 395.21, 395.3, 370/395.4, 396, 397, 400, 401
See application file for complete search history.

(56) References Cited

U.S. PATENT DOCUMENTS

| 7,092,389 | B2* | 8/2006 | Chase et al. | 370/389 |
| 7,327,682 | B2* | 2/2008 | Gandhi et al. | 370/235.1 |
| 2002/0107908 | A1* | 8/2002 | Dharanikota | 709/203 |
| 2003/0161284 | A1* | 8/2003 | Chen | 370/331 |
| 2004/0057437 | A1* | 3/2004 | Daniel et al. | 370/395.43 |
| 2004/0228354 | A1* | 11/2004 | Anschutz et al. | 370/395.21 |

OTHER PUBLICATIONS

Blake et al., An Architecture for Differentiated Services, Network Working Group RFC 2475 Informational Memorandum, Dec. 1998, pp. 1-36, The Internet Society, U.S.A.
Davie et al., An Expedited Forwarding PHB, Network Working Group RFC 2598, Standards Track Memorandum, Mar. 2002, pp. 1-16, The Internet Society, U.S.A.
Haddock, S., L2 Packet Marking for Drop Precedence, www.ieee802.org/1/files/public/docs2003/L2%20Packet%20Marking_2_Haddock_revised.ppt, May 6, 2003, pp. 1-11, Extreme Ne . . . .
Heinanen et al., Assured Forwarding PHB Group, Network Working Group RFC 2597 Standards Track Memorandum, Jun. 1999, pp. 1-11, The Internet Society, U.S.A.
Santitoro, R., Metro Ethernet Services—A Technical Overview, http://www.metroethernetforum.org, Apr. 2003, pp. 1-19, v.2.5, Metro Ethernet Forum, U.S.A.
Technical Specification MEF 1—Ethernet Services Model Phase 1, http://www.metroethernetforum.org, Nov. 10, 2003, pp. 1-22, MEF 1, Metro Ethernet Forum, U. S.A.
Technical Specification MEF 2—Requirements and Framework for Ethernet . . . , http://www.metroethernetforum.org, Feb. 8, 2004, pp. 1-41, MEF 2.0, Metro Ethernet Forum, U. S.A.

* cited by examiner

*Primary Examiner*—Chirag G Shah
*Assistant Examiner*—Yong Zhou
(74) *Attorney, Agent, or Firm*—Ridout & Maybee LLP

(57) ABSTRACT

Numerous enhancements to metro Ethernet network (MEN) services include an enhancement of the overall MEN Quality of Service (QoS) architecture, an enhancement to classification at the provider edge, the use of Ethernet QoS classes, enhancements to policing and marking at ingress provider edge equipment, the provision of traffic management functions at egress provider edge equipment, the use of multiple Ethernet virtual connections (EVCs) and Aggregate EVCs, an enhancement to QoS across an external network-network interface and an enhancement to treatment of Ethernet service frames in a core network.

83 Claims, 13 Drawing Sheets

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 2 |
| GOLD | E-AF42 | E-AF4 | 4 | 2 |
| SILVER | E-AF31 | E-AF3 | 3 | 3 |
| SILVER | E-AF32 | E-AF3 | 3 | 3 |
| BRONZE | E-AF21 | E-AF2 | 2 | 4 |
| BRONZE | E-AF22 | E-AF2 | 2 | 4 |
| BEST EFFORT | E-DF | E-DF | 1 | 5 |

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 1 |
| GOLD | E-AF42 | E-AF4 | 4 | 1 |
| SILVER | E-AF31 | E-AF3 | 3 | 2 |
| SILVER | E-AF32 | E-AF3 | 3 | 2 |
| BRONZE | E-AF21 | E-AF2 | 2 | 2 |
| BRONZE | E-AF22 | E-AF2 | 2 | 2 |
| BEST EFFORT | E-DF | E-DF | 1 | 3 |

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 1 |
| GOLD | E-AF42 | E-AF4 | 4 | 1 |
| SILVER | E-AF31 | E-AF3 | 3 | 1 |
| SILVER | E-AF32 | E-AF3 | 3 | 1 |
| BRONZE | E-AF21 | E-AF2 | 2 | 1 |
| BRONZE | E-AF22 | E-AF2 | 2 | 1 |
| BEST EFFORT | E-DF | E-DF | 1 | 1 |

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| VARIABLE RATE (REAL-TIME) | • LOW FRAME DELAY, FRAME DELAY VARIATION AND FRAME LOSS<br>• VARIABLE RATE VOICE, VIDEO CONFERENCING, GAMING | CIR > 0<br>CBS > 0<br>EIR > 0<br>EBS > 0 | • ADMIT NON-CONFORMANT FRAMES UP TO EIR<br>• EXCESS FRAMES ARE ASSIGNED HIGH DROP PRECEDENCE | • MINIMUM BANDWIDTH ASSURANCE<br>• SUPPORT DELAY BOUNDS<br>• DROP EXCESS FRAMES FIRST WHEN CONGESTED<br>• EXAMPLE E-PHB = E-AF4 |

FIG. 7

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| VARIABLE RATE (NON-REAL-TIME) | • LOW FRAME LOSS<br>• ENTERPRISE APPLICATIONS | CIR > 0<br>CBS > 0<br>EIR > 0<br>EBS > 0 | • ADMIT NON-COMPLIANT FRAMES UP TO EIR<br>• EXCESS FRAMES ARE ASSIGNED HIGH DROP PRECEDENCE | • MINIMUM BANDWIDTH ASSURANCE<br>• NO DELAY BOUND<br>• DROP EXCESS FRAMES FIRST WHEN CONGESTED<br>• EXAMPLE E-PHB = E-AF2 |

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| BEST EFFORT | • NO HARD QOS GUARANTEES<br>• WEB SURFING, E-MAIL, BULK TRANSFER | CIR = 0<br>CBS = 0<br>EIR > 0 (POSSIBLY EQUAL PHYSICAL RATE)<br>EBS > 0 (LARGE) | • ALL FRAMES ARE ADMITTED WITH HIGH DROP PRECEDENCE | • SMALL BANDWIDTH ASSURANCES<br>• NO DELAY BOUND<br>• DROP FIRST WHEN CONGESTED<br>• EXAMPLE E-PHB = E-DF |

FIG. 9

METRO ETHERNET SERVICE ENHANCEMENTS

CROSS REFERENCE TO RELATED APPLICATIONS

The present application claims the benefit of prior provisional application Ser. No. 60/537,744, filed Jan. 20, 2004.

FIELD OF THE INVENTION

The present invention relates to Metro Ethernet services and, more particularly, to enhancements to the handling of Ethernet service frames within Metro Ethernet Networks.

BACKGROUND

A provider of data communications services typically provides a customer access to a large data communication network. This access is provided at "edge equipment" that connects a customer network to the large data communication network. As such, service providers have a broad range of customers with a broad range of needs, the service providers prefer to charge for their services in a manner consistent with which the services are being used. Such an arrangement also benefits the customer. To this end, a Service Level Agreement (SLA) is typically negotiated between customer and service provider. An SLA is a contract between the customer and service provider specifying agreed-to service level commitments. A Service Level Specification is a technical specification of the service being offered by the service provider to the customer.

To provide predetermined levels of service to a given customer, a service provider may consider monitoring and controlling the traffic from the given customer. Such monitoring and controlling is often referred to as "traffic management".

Traditionally, Ethernet networks have had no traffic management capabilities. The Ethernet standard, known as IEEE 802.3, specifies the use of a PAUSE frame that allows a client to request a pause in transmission from a terminal attached to a given port. However, the PAUSE frame may only be employed on per port basis and may only be employed with respect to directly attached devices, which are not necessarily the originators of the traffic requiring management.

Recently, the Institute of Electrical and Electronics Engineers (IEEE) has introduced a user priority indication capability that enables the definition of up to eight service classes, also known as Classes of Service (CoS). A set of Ethernet frames that have the same user priority indication may receive the same level of performance within the service provider's network, where level of performance is usually measured in terms of frame loss ratio, frame delay and frame delay variation.

A standard known as IEEE 802.1Q defines an architecture for a general purpose Virtual Local Area Network (VLAN) that may be implemented within a customer network and describes a four-byte extension to Ethernet service frame headers known as an IEEE 802.1Q tag. This tag includes a number of fields, including a 12-bit VLAN-ID field and a three-bit "user priority" field used to signal compliant devices. These three bits (normally referred to as the "p-bits") provide for eight possible values, which match those used in the known IEEE 802.1p user priority field. The p-bits and VLAN-ID may be used in an IEEE 802.1Q tag to provide an identity of a CoS and, therefore, may be said to represent a VLAN CoS ID.

To allow the deployment of Ethernet to carrier networks, the Metro Ethernet Forum (MEF) has recently been active in specifying traffic management capabilities for a metro Ethernet network (MEN). See MEF Technical Specification "Ethernet Service Model, Phase 1" available from www.metroethernetforum.org and hereby incorporated herein by reference. The work includes specifying Ethernet traffic parameters and traffic conditioning (policing) algorithms and actions. The MEF traffic parameters include: committed information rate (CIR), excess information rate (EIR), committed burst size (CBS), excess burst size (EBS). The traffic conditioning algorithms and actions relate to how Ethernet service frames are handled when they are found to comply with the traffic measurement parameters and when they are found not to comply with the traffic measurement parameters.

A single Ethernet VLAN has a capability to support the transmission of Ethernet service frames requiring different classes of service (up to eight). This capability differentiates Ethernet VLANs from connections defined by other technologies such as Frame Relay (FR) or Asynchronous Transfer Mode (ATM).

The MEF has defined basic traffic management at the User-Network Interface (UNI). The UNI may be defined as the physical demarcation point between the responsibility of a service provider and the responsibility of a subscriber. The service provider may provide one or more connections, each known as an Ethernet Virtual Connection (EVC), through the MEN. An EVC may be considered an instance of an association of two or more UNIs. Notably, it is known that a given UNI can support more than one EVC through the use of a Service Multiplexing capability.

As specified in "Ethernet Service Model, Phase 1" an Ethernet service frame is defined as any Ethernet frame transmitted across a UNI.

As provided for by an MEF definition of traffic management over a point-to-point EVC, provider edge equipment (PE) in a MEN receives, over a first UNI, an Ethernet service frame from customer edge equipment (CE) in a customer network. The provider and customer edge equipment may be switches, routers, switch/routers, or similar devices performing Ethernet transport/switching functions. The PE then identifies the EVC to which the service frame belongs (i.e., the PE determines an "EVC-ID") and sends the service frame to the PE in the MEN that is connected to a customer network via a second UNI, which is associated with the first UNI in the EVC. Identification of the EVC is defined as involving determining a VLAN identifier (VLAN-ID) from the IEEE 802.1Q tag on the service frame. A map may then be consulted to determine the identity of an EVC corresponding to the determined VLAN-ID. The sending of the Ethernet service frame to the PE connected to the UNI that is associated with the first UNI in the EVC may be accomplished in many ways, as the MEN may be implemented using a protocol of the choice of the provider. Popular choices for MEN protocol include Ethernet, ATM, Multi-Protocol Label Switching (MPLS), FR, Internet Protocol (IP) and Synchronous Optical Network/Synchronous Digital Hierarchy (SONET/SDH).

To further coordinate MEF traffic management, the MEF has defined a term "Class of Service Identifier", or CoS-ID, for information derivable from an Ethernet service frame that allows the identification of a required Class of Service treatment of the Ethernet service frame. Continuing the example presented hereinbefore, the MEF has described the derivation of the CoS-ID from the EVC-ID alone or from the EVC-ID in combination with the p-bits from the user priority field of the IEEE 802.1Q tag.

The MEF recommends determining a CoS to associate with a received Ethernet service frame based, at least in part, on the VLAN CoS-ID. In particular, the VLAN CoS-ID may be used to determine CoS aspects such as a Bandwidth Profile and forwarding treatment. A Bandwidth Profile may used to specify the traffic measurement parameters (e.g., CIR, CBS, EIR, EBS) that may be used for traffic policing and resource reservation.

In reviewing the MEF definitions, it may be considered that, although the basic traffic management techniques are useful, several enhancements may be implemented to improve the experience of both the customer and the provider.

SUMMARY

Suggested enhancements to metro Ethernet network (MEN) services include an enhancement of the overall MEN Quality of Service (QoS) architecture, an enhancement to classification at the provider edge, the use of Ethernet service classes and QoS classes, enhancements to policing and marking at an ingress provider edge equipment, the provision of traffic management functions at an egress PE, the use of multiple Ethernet virtual connections (EVCs) and Aggregate EVCs, an enhancement to QoS across an external network-network interface and an enhancement to treatment of Ethernet service frames in a core network.

In accordance with an aspect of the present invention there is provided a traffic management system for a provider edge node in a Metro Ethernet Network. The traffic management system includes a classifier operable to determine, based on information recorded in a header of a received Ethernet service frame, a service class for the received Ethernet service frame, where the service class is associated with a forwarding treatment for the Ethernet service frame, a marker operable to indicate the forwarding treatment for the received Ethernet service frame based on the service class and a forwarder operable to transmit the received Ethernet service frame to a node in the metro Ethernet network.

In accordance with another aspect of the present invention there is provided a traffic management method. The method includes receiving an Ethernet service frame, determining, based on information in a header of the Ethernet service frame, a service class for the Ethernet service frame, where the service class is associated with a forwarding treatment for the Ethernet service frame, indicating the forwarding treatment for the Ethernet service frame based on the service class and transmitting the Ethernet service frame to a node in a metro Ethernet network. In an additional aspect, a non-transitory medium is provided to adapt a processor to carry out this method.

In accordance with a further aspect of the present invention there is provided a method of handling an Ethernet service frame. The method includes receiving an Ethernet service frame over a user-network interface, determining an identity of an Ethernet virtual connection to associate with the Ethernet service frame, determining a set of information from indications in the Ethernet service frame and determining a service class for the Ethernet service frame based, at least in part, on the set of information. In additional aspects, a traffic management system is provided for carrying out this method and a non-transitory medium is provided to adapt a processor to carry out this method.

In accordance with an even further aspect of the present invention there is provided a method of classifying an Ethernet service frame. the method includes receiving an Ethernet service frame, determining an identity of an Ethernet virtual connection to associate with the Ethernet service frame and determining a forwarding treatment to associate with the Ethernet service frame. In additional aspects, a classifier in a traffic management system is provided for carrying out this method and a non-transitory medium is provided to adapt a processor to carry out this method.

In accordance with an even further aspect of the present invention there is provided a method of handling an Ethernet service frame. The method includes storing definitions of a plurality of quality of service (QoS) classes, receiving an Ethernet service frame and selecting a candidate QoS class, from among the plurality of QoS classes, for the Ethernet service frame. The method further includes determining a type and at least one limit for a traffic parameter for the Ethernet service frame, based on the QoS class, determining a compliance rule for the Ethernet service frame, based on the QoS class, determining a performance target for the Ethernet service frame, based on the QoS class and servicing the Ethernet service frame according to the type and the at least one limit for the traffic parameter, the performance target and the compliance rule. In other aspects, there is provided a traffic management system operable to carry out this method and a non-transitory medium is provided to adapt a processor to carry out this method.

In accordance with an even further aspect of the present invention there is provided a method of handling an Ethernet service frame. The method includes receiving an Ethernet service frame from a node in a service provider network communicatively coupled to a plurality of customer networks, determining a service class for the Ethernet service frame, where the service class is associated with a forwarding treatment for the Ethernet service frame, indicating a forwarding treatment for the Ethernet service frame based on the service class and transmitting the Ethernet service frame to customer edge equipment over a user-network interface, where the customer edge equipment is included in a given customer network among the plurality of customer networks. In other aspects, there is provided a traffic management system operable to carry out this method and a non-transitory medium is provided to adapt a processor to carry out this method.

In accordance with an even further aspect of the present invention there is provided a method of classifying an Ethernet service frame. The method includes receiving an Ethernet service frame over a user-network interface and determining a service class to associate with the Ethernet service frame, where the determining is based, at least in part, on an identity of the user-network interface, where the service class is associated with a forwarding treatment for the Ethernet service frame. In additional aspects, a classifier in a traffic management system is provided for carrying out this method and a non-transitory medium is provided to adapt a processor to carry out this method.

In accordance with an even further aspect of the present invention there is provided a method of handling an Ethernet service frame. The method includes receiving an Ethernet service frame from a node in a metro Ethernet network, determining an identity of a Bandwidth Profile for the Ethernet service frame, generating an indication of the identity of the Bandwidth Profile and transmitting the Ethernet service frame to customer edge equipment over a user-network interface. In other aspects, there is provided a traffic management system operable to carry out this method and a non-transitory medium is provided to adapt a processor to carry out this method.

In accordance with an even further aspect of the present invention there is provided a method of configuring a service provider network, where the service provider network includes a plurality of provider edge equipment, where a subset of the plurality of provider edge equipment are in communication with a plurality of customer edge equipment over a plurality of user-network interfaces. The method includes establishing a first Ethernet virtual connection, where the first Ethernet virtual connection associates a first user-network interface of the plurality of user-network interfaces with a second user-network interface of the plurality of user-network interfaces, establishing a second Ethernet virtual connection, where the second Ethernet virtual connection associates the first user-network interface with the second user-network interface and defining a first Ethernet virtual connection group to include the first Ethernet virtual connection and the second Ethernet virtual connection. In other aspects, there is provided a traffic management system operable to carry out this method and a non-transitory medium is provided to adapt a processor to carry out this method.

In accordance with an even further aspect of the present invention there is provided a method of handling an Ethernet service frame. The method includes receiving an Ethernet service frame, determining an identity of an Ethernet virtual connection group to which to associate the Ethernet service frame, the Ethernet virtual connection group including a plurality of Ethernet virtual connections, associating the Ethernet service frame with the Ethernet virtual connection group, selecting an Ethernet virtual connection from among the plurality of Ethernet virtual connections in the Ethernet virtual connection group, resulting in a selected Ethernet virtual connection and transmitting the Ethernet service frame over the selected Ethernet virtual connection. In other aspects, there is provided a traffic management system operable to carry out this method and a non-transitory medium is provided to adapt a processor to carry out this method.

In accordance with an even further aspect of the present invention there is provided a method of handling an Ethernet service frame. The method includes receiving an Ethernet service frame, determining an identity of a first Ethernet virtual connection to associate with the Ethernet service frame, where the first Ethernet virtual connection is defined to traverse a metro Ethernet network, determining an identity of an aggregate Ethernet virtual connection based on the identity of the Ethernet virtual connection, where the aggregate Ethernet virtual connection includes the first Ethernet virtual connection among a plurality of Ethernet virtual connections that associate a plurality of user-network interfaces at the same provider edge equipment and transmitting the Ethernet service frame over the Ethernet virtual connection. In other aspects, there is provided a traffic management system operable to carry out this method and a non-transitory medium is provided to adapt a processor to carry out this method.

In accordance with an even further aspect of the present invention there is provided, at a provider edge equipment in a core network, a method of handling an Ethernet service frame. The method including receiving an Ethernet service frame over a user-network interface, determining an access service class for the Ethernet service frame, determining a core service class for the Ethernet service frame based on the access service class and selecting a core connection in the core network based on the access service class. The method also includes encapsulating the Ethernet service frame in a core protocol data unit, the core protocol data unit having a core header, including in the core header an indication of the core service class and transmitting the core protocol data unit on the core connection. In other aspects, there is provided a provider edge equipment in a core network operable to carry out this method and a non-transitory medium is provided to adapt a processor to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3 illustrates a first exemplary service class map according to an embodiment of the present invention;

FIG. 4 illustrates a second exemplary service class map according to an embodiment of the present invention;

FIG. 5 illustrates a third exemplary service class map according to an embodiment of the present invention;

FIG. 7 illustrates a definition for a "Variable Rate (Real-Time)" QoS class according to an embodiment of the present invention;

FIG. 8 illustrates a definition for a "Variable Rate (Non-Real-Time)" QoS class according to an embodiment of the present invention;

FIG. 9 illustrates a definition for a "Best Effort" QoS class according to an embodiment of the present invention;

DETAILED DESCRIPTION

Figure 1:
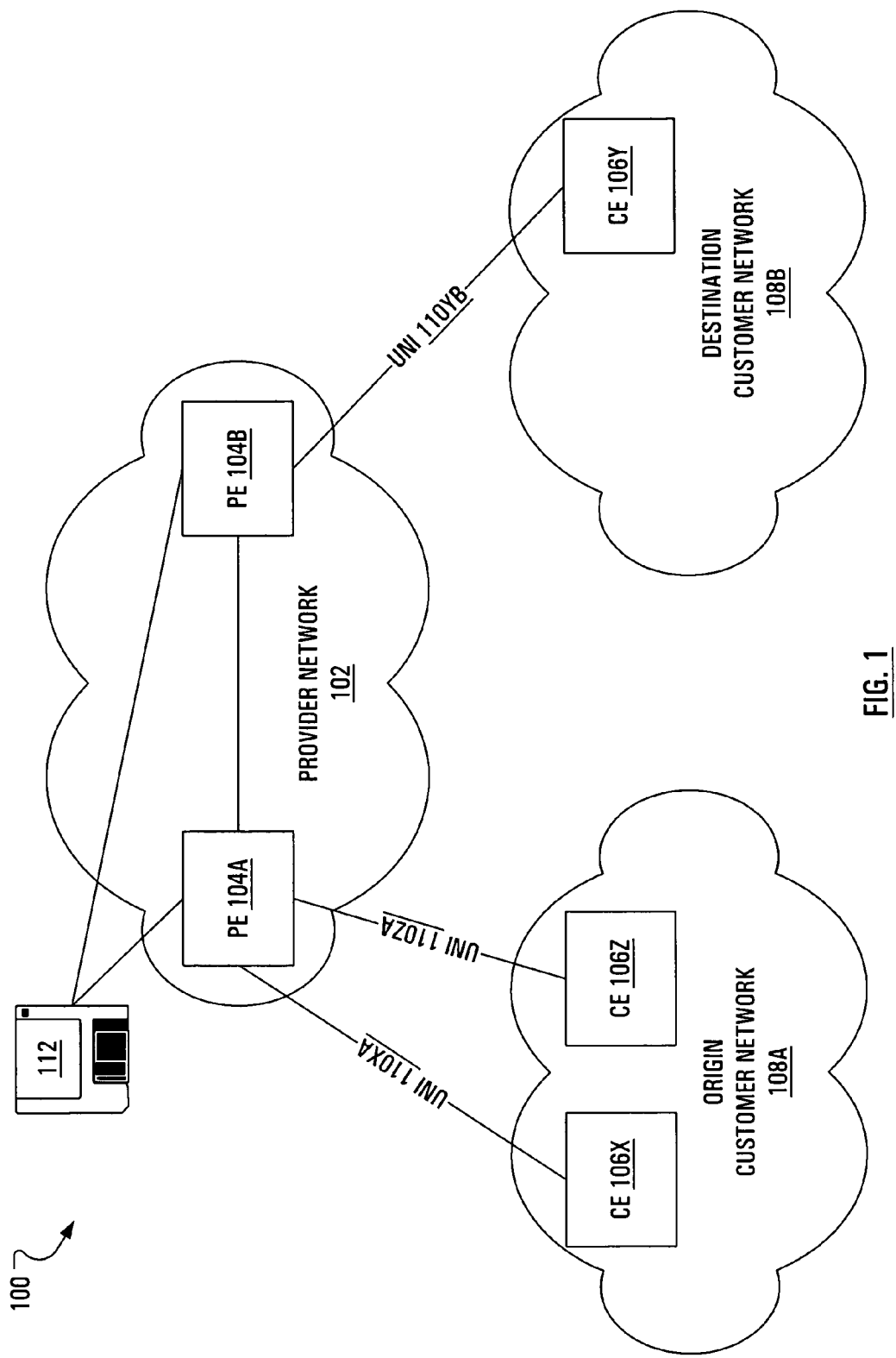
FIG. 1 illustrates an exemplary network including a provider network and several customer sites.

FIG. 1 illustrates an exemplary network 100 including a provider network 102 and two, of potentially many, customer networks. The customer networks are named, relative to an example to be presented hereinafter, as an origin customer network 108A and a destination customer network 108B. The provider network 102 may include multiple PEs including a first PE 104A and a second PE 104B (collectively or individually 104). The origin customer network 108A includes a first CE 106X and a second CE 106Z, while the destination customer network 108B includes a third CE 106Y.

It has been discussed hereinbefore that a UNI may be defined as the physical demarcation point between the responsibility of a service provider and the responsibility of a subscriber. In the network 100 of FIG. 1, a first UNI 110XA is illustrated connecting the first CE 106X to the first PE 104A. Additionally, a second UNI 110ZA is illustrated connecting the second CE 106Z to the first PE 104A and a third UNI 110YB is illustrated connecting the third CE 106Y to the second PE 104B.

The PEs 104 may be loaded with traffic management software for executing methods exemplary of this invention from a non-transitory medium 112 which could be a disk, a tape, a chip or a random access memory containing a file downloaded from a remote source. As will be apparent to a person of ordinary skill however, traffic management exemplary of this invention may be implemented in hardware, firmware or combinations of hardware, firmware and software. For instance, aspects of the invention may be implemented using a network processing unit or field programmable gate arrays (FPGAs).

For the purposes of this document, a Metro Ethernet Network may be considered to include the provider network 102 and the CEs 106XA, 106ZA, 106YB.

Figure 2:
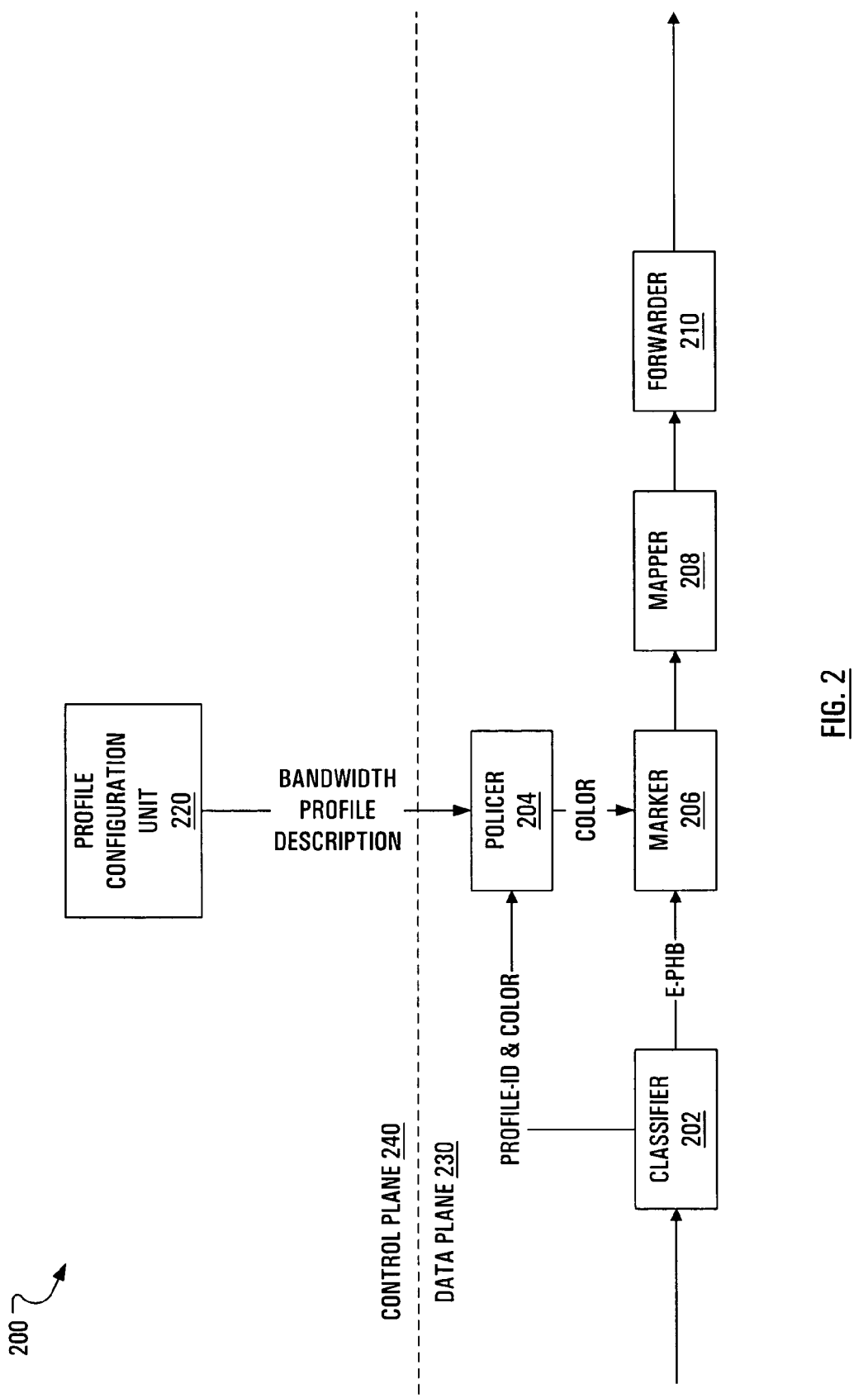
FIG. 2 illustrates a logical architecture for an ingress traffic management system for provider edge equipment in the provider network of FIG. 1.

FIG. 2 illustrates an ingress traffic management system 200 for use in either of the PEs 104. The ingress traffic management system 200 is illustrated as divided into a control plane 240 and a data plane 230. The data plane 230 includes a classifier 202, a policer 204, a marker 206, a mapper 208 and a forwarder 210. The control plane 240 includes a policing configuration unit 220. The control plane 240 may also include further configuration units (not shown) related to functions of other elements of the data plane 230. Such further configuration units may employ signaling methods not yet contemplated. As will be apparent to a person of ordinary skill in the art, the elements of the ingress traffic management system 200 are intended to represent functions and an order of operations rather than physical entities.

Hereinafter, terminology is borrowed from the specification of IP Differentiated Services ("DiffServ", see Blake, S., et. al., "An Architecture for Differentiated Services", Internet Engineering Task Force (IETF) Request for Comments (RFC) 2475, December 1998, which may be found at www.ietf.org). Such terminology includes "per-hop behavior", "per-hop scheduling" class and "drop precedence". As will be appreciated by the skilled reader, such terminology is not in wide use with respect to Ethernet service frames and may be defined similarly, with some differences. However, the terminology is used herein in place of more generic language, e.g., forwarding treatment, scheduling treatment, precedence, for the sake of clarity. To accentuate the difference herein, an "E" will be used to distinguish an Ethernet per-hop behavior (E-PHB) from an IP DiffServ per-hop behavior (PHB), an Ethernet per-hop scheduling class (E-PSC) from IP DiffServ per-hop scheduling class (PSC), etc.

In operation of the ingress traffic management system 200 of FIG. 2, the ingress traffic management system 200 initially receives an Ethernet service frame, in one case from the first CE 106A over the first UNI 110XA. Traffic management information about the received Ethernet service frame may be determined by the classifier 202. The traffic management information may include an Ethernet service class and an E-PHB, from which may be determined an E-PSC and a color to associate with the Ethernet service frame. An Ethernet service class may be defined such that all Ethernet service frames associated with a given Ethernet service class receive identical forwarding treatment and policing treatment. A service provider may, for instance, offer three Ethernet service classes (e.g., Gold, Silver, Bronze).

Where policing of the Ethernet service frame is required, a Bandwidth Profile is required to be associated with the Ethernet service frame. An identity of a Bandwidth Profile to be used when policing the Ethernet service frame may be determined based on the E-PSC. The policer 204 may then determine compliance of the Ethernet service frame to the identified Bandwidth Profile and may, based on the determined compliance, replace the color previously associated with the Ethernet service frame with a new color.

Without regard to whether the color has been replaced, at the marker 206, the E-PSC and the color associated with the Ethernet service frame after processing by the policer 204 may be used to determine a forwarding treatment to associate with the Ethernet service frame in the provider network 102. The marker 206 may then generate an indication of the forwarding treatment. Optionally, the marker 206 may also mark/re-mark the header of the Ethernet service frame to indicate the forwarding treatment to subsequent nodes and/or networks. The latter marking may involve manipulating the p-bits. The marker 206 may also manipulate IP DSCP or other header fields. The mapper 208 may relate the protocols used in the provider network 102 to the protocol used in the origin customer network 108A. In particular, the forwarding treatment of the Ethernet service frame indicated by the marker 206 may be mapped to a core forwarding treatment (a forwarding treatment in the provider network 102). The Ethernet service frame may then be marked by the mapper 208 with the core forwarding treatment determined from the mapping. The forwarder 210 may then transmit the Ethernet service frame to a node in the provider network 102.

Alternatively, where the PE performs a switching function, the forwarder 210 may transmit the Ethernet service frame to the second CE 106Z in the origin customer network 108A of FIG. 1.

To determine the traffic management information, it may be necessary for the classifier 202 to determine an identity of an Ethernet virtual connection (EVC-ID) to associate with the Ethernet service frame. An Ethernet service class may be determined based on the EVC-ID and the traffic management information derived based on knowledge of the Ethernet service class.

To determine the EVC-ID, it may be necessary for the classifier 202 to determine the identity of the port on which the Ethernet service frame was received. The classifier 202 may also determine, from the IEEE 802.1Q tag of the Ethernet service frame, a VLAN-ID to associate with the Ethernet service frame. The EVC-ID may then be determined based on a combination of port identity and the VLAN-ID.

Alternatively, determining the EVC-ID may be based on a source Medium Access Control (MAC) address and/or a destination MAC address indicated in the header of the Ethernet service frame. Additionally, the EVC-ID may be determined based on a combination of the source and destination MAC address and the VLAN-ID.

It should be clear that the hereinbefore-described determination of the EVC-ID includes scenarios wherein a single EVC-ID is associated with a group of MAC source and/or destination addresses, or wherein a single EVC-ID is associated with a group of VLAN IDs.

Determining the access E-PHB may then be based, at least in part, on the EVC-ID. Additionally or alternatively, determining the access E-PHB may be based on frame information in the Ethernet service frame related to any of the seven Open System Interconnect (OSI) layers. Common OSI layer frame information may be determined from the p-bits in the IEEE 802.1Q tag or the IP Differentiated Services Code Point (DSCP) fields. Other frame information may be used, such as information found in the Ethernet Canonical Format Indicator (CFI) field in the IEEE 802.1Q tag, the VLAN-ID, the Ethertype, the IP source and/or destination addresses, the IP protocol type, the Transmission Control Protocol (TCP) port number or the User Datagram Protocol (UDP) port number.

To determine an identity of a Bandwidth Profile to associate with an Ethernet service frame, the classifier 202 may use a service class map, which associates each known Ethernet service class with access E-PHBs and E-PSCs. An exemplary service class map 300 is illustrated in FIG. 3. Based on the Ethernet service class then, the classifier 202 may determine an access E-PHB and an E-PSC for the Ethernet service frame. The classifier 202 may then determine the identity of a Bandwidth Profile for the Ethernet service frame, where the determining is based on an association, in the selected service class map, with the determined E-PSC.

In the exemplary service class map 300, eight E-PHBs are identified as EF, AF41, AF42, AF31, AF32, AF21, AF22 and DF. Such identifications should be familiar to the skilled reader as being related to "Expedited Forwarding" (EF), "Assured Forwarding" (AF) and "Default Forwarding" (DF) as used in IP DiffServ. Expedited Forwarding is described in Davie, B., et al., "An Expedited Forwarding PHB (Per-Hop Behavior)", IETF RFC 3246, March 2002, and Assured Forwarding is described in Heinanen, J., et al., "Assured Forwarding PHB Group", IETF RFC 2597, June 1999 (see www.ietf.org).

The Expedited Forwarding (EF) E-PHB may be considered suitable for Ethernet service frames related to services that require frames to be delivered within tight delay and loss bounds. Reordering of the Ethernet service frames is not allowed.

The Assured Forwarding (AF) E-PHB generally defines N classes, with each of the N classes having M discard priorities (drop precedence). E-AFik means E-AF class i and drop precedence k, where $1<=i<=N$ and $1<=k<=M$. Reordering of the Ethernet service frames is not allowed within a class.

The Default Forwarding (DF) E-PHB may be considered suitable for Ethernet service frames related to services with no performance guarantees, e.g., best effort. Reordering of the Ethernet service frames is not allowed.

A first alternative exemplary service class map 400 is illustrated in FIG. 4 and a second alternative exemplary service class map 500 is illustrated in FIG. 5. As illustrated in comparing the first alternative exemplary service class map 400 and the second alternative exemplary service class map 500, different E-PSCs may be associated with the same or different Bandwidth Profiles. The selection of a particular service class map may be based on the EVC-ID of the Ethernet service frame, the identity of the UNI over which the Ethernet service frame is received, the PE at which the Ethernet service frame is received or the provider network 102 at which the Ethernet service frame is received.

The classifier 202 may also determine a color to associate with a received Ethernet service frame. Such a determination may be, for instance, based on the access E-PHB determined for the received Ethernet service frame (i.e., E-EF and E-AF31 correspond to green, E-AF32 and DF correspond to yellow and E-AF33 corresponds to red). The color associated with a given Ethernet service frame may determine treatment of the given Ethernet service frame at the policer 204.

For the purposes of the herein-proposed enhancements to Metro Ethernet Services, each EVC is considered to be a bidirectional, point-to-point connection. As such, there is a possibility that the Bandwidth Profiles in the two directions may not be identical. An EVC can be associated with one or more Bandwidth Profiles and with one or more forwarding treatments (E-PHBs). Three types of EVCs may be defined from Quality of Service (QoS) perspective:

A single service class EVC having one Bandwidth Profile and a single forwarding treatment for all Ethernet service frames;

A multi-service-class EVC having one Bandwidth Profile and multiple forwarding treatments for the Ethernet service frames; and A multi-service-class EVC having multiple Bandwidth Profiles and multiple forwarding treatments for the Ethernet service frames.

The Bandwidth Profile is feature of the control plane 240 (see FIG. 2) used for resource reservation and allocation, admission control and traffic policing. The E-PHB is a feature of the data plane 230 (see FIG. 2) that is used to indicate a forwarding treatment for a given Ethernet service frame.

The Bandwidth Profile and forwarding treatment do not have a one-to-one mapping in the herein-presented model in that Ethernet service frames with different E-PHBs may be associated with the same Bandwidth Profile or may be associated with separate Bandwidth Profiles in a flexible manner.

In common operation, the classifier 202 receives an Ethernet service frame, determines an EVC-ID to associate with the Ethernet service frame and determines a E-PHB (forwarding treatment) to associate with the Ethernet service frame.

As discussed hereinbefore, the EVC-ID may be determined based on the identity of a port on which the Ethernet service frame was received, based on the identity of the port in combination with a VLAN-ID determined for the Ethernet service frame, based on a MAC address identified in the header of the Ethernet service frame or based on the MAC address in combination with a VLAN-ID determined for the Ethernet service frame. Notably, an EVC with a given EVC-ID may carry Ethernet service frame associated with multiple VLAN-IDs. Additionally, the MAC address may include source and destination MAC addresses, source MAC address only or destination MAC address only. Multiple MAC addresses (with possible wild cards/ranges) may be classified together within the same EVC-ID.

As discussed hereinbefore, the E-PHB may be determined based on p-bits, IP DSCP or VLAN-ID.

Five useful combinations of Ethernet service frame information that may be used by the classifier 202 when classifying incoming Ethernet service frames are as follows:

1. VLAN-ID+p-bits;
2. VLAN-ID+IP DSCP (only if Ethernet payload is IP, and DSCP is set properly);
3. Port+p-bits (called priority-tagged. The 802.1Q tag is present but VLAN-ID is not used);
4. VLAN-ID+VLAN-ID (for example, three VLAN-IDs may be associated with a single customer, carrying Gold, Silver and Bronze traffic, and grouped into a single EVC-ID); and
5. Port+DSCP (applicable to both tagged and untagged Ethernet interfaces. VLANs are not used).

While an identity of a Bandwidth Profile may be determined by the classifier 202, the identity is used at the policer 204 to select the corresponding Bandwidth Profile and process the Ethernet service frame according to traffic parameters specified in the identified Bandwidth Profile. The specification of traffic parameters for a given Bandwidth Profile is accomplished by the profile configuration unit 220 (see FIG. 2).

In operation, the policer 204 determines compliance of a received Ethernet service frame to an identified Bandwidth Profile and generates an indication of the compliance of the Ethernet service frame to the identified Bandwidth Profile. Depending on a mode of operation of the ingress traffic management system 200 (e.g., color-aware, color-blind, to be discussed hereinafter) the color associated with a received Ethernet service frame may determine the action taken by the policer 204.

The actions taken by the policer 204 may include, if the Ethernet service frame is determined not to be compliant with the bandwidth profile, dropping the Ethernet service frame, that is, actively determining that the Ethernet service frame is not to be forwarded to its intended destination. The actions taken by the policer 204 may also include, if the Ethernet service frame is determined not to be compliant with the Bandwidth Profile, merely generating an indication of the lack of compliance so that the marker 206 may take related action. Such an indication of the lack of compliance may be a replacement of the color associated with the Ethernet service frame in a manner well known in the art.

Based on the color associated with an Ethernet service frame after processing by the policer 204 and the E-PSC associated with the Ethernet service frame by the classifier 202, the marker 206 may determine a new forwarding treatment, more specifically, often an E-PHB, to associate with the Ethernet service frame.

Where policing is not required for an Ethernet service frame, the marker 206 may associate a forwarding treatment with the Ethernet service frame based on an access E-PHB determined by the classifier 202. Such forwarding treatment indication may involve writing an indication of the forwarding treatment in a memory location associated with the Ethernet service frame.

There may be circumstances, as predetermined by an agreement between a customer an operator of the provider network 102, in which the Ethernet service frame is to be manipulated based on determinations of the ingress traffic management system 200. Such manipulation may be performed at the marker 206.

As such, the marker 206 may be considered to be comprised of two parts (not shown): a part for indicating a forwarding treatment for the Ethernet service frame under consideration; and a part for manipulating the Ethernet service frame.

It should be clear that, under many circumstances, the Ethernet service frame is to be transported through the service provider network 102 transparently, i.e., without manipulation of the contents.

The protocol in use in the provider network 102 may allow the definition of connections that incorporate a type of core forwarding treatment. As such, according to a mapped correspondence between the Ethernet service class and a particular core forwarding treatment, the particular core forwarding treatment may be selected for a received Ethernet service frame based on the determined Ethernet service class. Once selected, the Ethernet service frame, more particularly, whatever protocol data unit that is carrying the received Ethernet service frame, may be marked by the mapper 208 with an indication of the particular core forwarding treatment.

As will be understood by a person of ordinary skill in this art, the provider network 102 may operate according to a protocol that is "connection-oriented" or "connection-less". When a connection is defined through the provider network 102, the connection may be a connection in a connection-oriented network (e.g., an ATM virtual connection) or an analog to a connection in a connection-less network (e.g., a tunnel in an IP network).

As discussed hereinbefore, the protocol in use in the provider network 102 may be one of Ethernet, ATM, MPLS, FR, IP and SONET/SDH. As such, the forwarder 210 may appropriately prepare the Ethernet service frame for transmission over the provider network 102. Such appropriate preparation may include encapsulating the Ethernet service frame in a protocol data unit of a type defined for the particular core protocol before transmitting the Ethernet service frame to a node in the provider network 102.

To transmit the Ethernet service frame to a node in the provider network 102 the forwarder 210 may select a candidate scheduling queue based on the E-PSC associated with the Ethernet service frame and transmit the Ethernet service frame to the candidate scheduling queue.

Furthermore a connection in the core (provider network 102) may be selected by the forwarder 210 according to an association with an Ethernet service class, as defined for the particular protocol in use in the core. The determined Ethernet service class may indicate a particular suitability of the selected core connection to satisfy the traffic parameters of the Ethernet service frame.

Thus far, the determination of an Ethernet service class to associate with a given Ethernet service frame has been discussed, and the derivation of traffic management functions from the Ethernet service class. This method offers significant flexibility. Alternatively, QoS classes may be defined which combine several traffic management functions and define performance objectives for the given Ethernet service frame.

QoS classes have been defined for protocols, other than Metro Ethernet, for which traffic management is more thoroughly developed. As traffic management is developed for Metro Ethernet Networks, QoS classes may play a role in defining a set of parameters and behaviors for use in traffic management in Metro Ethernet Networks.

In operation, the ingress traffic management system 200 stores definitions of several QoS classes. When an Ethernet service frame is received, a QoS class is selected for the Ethernet service frame by the classifier 202. Selecting the QoS class to associate with a received Ethernet service frame may be based on the classification of the Ethernet service frame in a manner similar to the methods described for determining an Ethernet service class to associate with a received Ethernet service frame. For example, the QoS class may be selected based on the EVC-ID determined for a particular Ethernet service frame. More often, the QoS class may be selected based on the EVC-ID together with information in the Ethernet service frame related to any of the seven Open System Interconnect (OSI) layers. Traffic parameter types and ranges (CIR, EIR, CBS, EBS) may then be associated with the Ethernet service frame, based on the selected QoS class. Similarly, compliance rules and performance targets (frame delay, frame delay variation, frame loss) may be associated with the Ethernet service frame, based on the selected QoS class. An access forwarding treatment may also be determined for the Ethernet service frame, based on the selected QoS class. The Ethernet service frame may then be processed by the ingress traffic management system 200 according to the information defined within the QoS class.

A number of standardized QoS classes may be predefined for a given PE 104. Additionally, a service provider may be provided with an opportunity to define additional QoS classes to suit specific requirements. Such additional classes may simply be modified versions of the standard QoS classes.

Several suggested QoS classes are defined in FIGS. 6-9.

Figure 6:
FIG. 6 illustrates a definition for a "Constant Rate" QoS class according to an embodiment of the present invention.

FIG. 6 illustrates a definition 600 for a "Constant Rate" QoS class. The definition 600 for the Constant Rate QoS class specifies performance targets as lowest frame delay available, lowest frame delay variation available and lowest frame loss available, specifies traffic parameters as a positive committed information rate, a positive committed burst size, a zero excess information rate and a zero excess burst size and specifies a compliance rule to indicate that non-compliant frames are to be dropped.

FIG. 7 illustrates a definition 700 for a "Variable Rate (Real-Time)" QoS class. The definition 700 for the Variable Rate (Real-Time) QoS class specifies performance targets as low frame delay available, low frame delay variation available and low frame loss, specifies traffic parameters as a positive committed information rate, a positive committed burst size, a positive excess information rate and a positive excess burst size and specifies a compliance rule to indicate that non-compliant frames are to be admitted up to the excess information rate and excess frames are to be assigned a high drop precedence.

FIG. 8 illustrates a definition 800 for a "Variable Rate (Non-Real-Time)" QoS class. The definition 800 for the Variable Rate (Non-Real-Time) QoS class specifies a performance target as low frame loss, specifies traffic parameters as a positive committed information rate, a positive committed burst size, a positive excess information rate and a positive excess burst size and specifies a compliance rule to indicate that non-compliant frames are to be admitted up to the excess information rate and excess frames are to be assigned a high drop precedence.

FIG. 9 illustrates a definition 900 for a "Best Effort" QoS class. The definition 900 for the Best Effort QoS class does not specify hard QoS guarantees, specifies traffic parameters as a zero committed information rate, a zero committed burst size, a large, positive excess information rate and a positive excess burst size and specifies a compliance rule to indicate that all admitted frames are to be assigned a high drop precedence.

Now that various aspects of the operation of the classifier 202 have been considered, attention may be turned to the aspects of operation of the policer 204.

Typical policing algorithms generally allow for color-aware and color-blind operation. In color-aware operation, a color that is associated with a received Ethernet service frame by the classifier 202 is considered at the policer 204 when determining compliance with a given Bandwidth Profile. In color-blind operation, a color that is associated with a received Ethernet service frame may be ignored when determining compliance with a given Bandwidth Profile. That is, each Ethernet service frame may be policed equally.

At the classifier 202, the E-PHB and color of a received Ethernet service frame may be determined, based on service definitions, rules and pre-existing CE markings on the received Ethernet service frame.

In a first mode of color-blind operation, CE marking (e.g., p-bits or IP DSCP) is ignored. The classifier 202, working in this first mode, assigns all incoming Ethernet service frames (per EVC or per UNI) the same color. For example, the classifier 202 may assign all received Ethernet service frames the color green or yellow. The classifier 202 may also assign all received Ethernet service frames the same E-PHB. The first mode of color-blind operation may be found to be of particular use where a PE is connected to a CE across non-trusted domain boundaries, e.g., when the CE markings cannot be trusted, either because of provider policy or inadequate CE marking capability.

In a second mode of color-blind operation, user drop precedence marking is ignored and scheduling treatment marking is respected. For example, the classifier 202 may assign incoming Ethernet service frames (per EVC or UNI) that are marked by the user as E-AF31, E-AF32, E-AF33, E-AF41, E-AF42, the green color. The classifier 202 allows the Ethernet service frames to maintain the indicated E-PHBs. As such, compliance may be measured per scheduling class, independent of the user drop precedence marking (the k in "AFik"), which may have significance only within the user network.

This second mode of color-blind operation is similar to the known ATM VBR.1 service that ignores the user CLP marking when determining conformance.

In a third mode of color-blind operation, which is similar to the second mode of color-blind operation, the ingress traffic management system 200 overrides the drop precedence indication of the packets according to the assigned color. For example, the classifier 202 may assign the color green to an incoming Ethernet service frame marked by the user with the E-AF42 marking. Subsequently, the marker 206 may change the marking to E-AF41, based on the assignment of the green color. In an opposite case, the classifier 202 may assign the color yellow to an incoming Ethernet service frame marked by the user with the E-AF41 marking. Subsequently, the marker 206 may change the marking to E-AF42, based on the assignment of the yellow color. The third mode of color-blind operation has the drawback of altering the original user marking of Ethernet service frames, but the third mode of color-blind operation may be seen as useful in some networking scenarios, for example, for indicating a drop precedence to the downstream nodes. This third mode of color-blind operation is somewhat similar to the ATM "forced tagging" feature when all incoming UBR user cells are tagged CLP1 to indicate low importance.

In color-aware operation, the classifier 202 assigns different colors to the Ethernet service frames, depending on incoming Ethernet service frames designation and the classification rules. For example, Ethernet service frames marked E-AF31 may be assigned the green color, Ethernet service frames marked E-AF32 may be assigned the yellow color and Ethernet service frames marked E-AF33 may be assigned the red color. Color-aware operation is suitable between trusted administrative domains. A common example of a trusted administrative domain may be found where a CE is managed by the provider.

Hereinbefore, the classifier 202 has classified (e.g., determined a service class for) a received Ethernet service frame based on a determined EVC-ID. Alternatively, the classifier 202 may classify a received Ethernet service frame based on the identity of the UNI over which the Ethernet service frame is received. In such a UNI-based classification embodiment, the architecture of the ingress traffic management system 200 is unchanged. Classification performed at the classifier 202 may include determining service classes and/or QoS classes. The key difference between the UNI-based classification embodiment and the EVC-based classification embodiment is the context for all traffic management functions is the UNI not the EVC. The classification, service class/QoS class, Bandwidth Profiles, service class maps, etc., are all applicable to the whole UNI rather than being applicable per EVC.

Determining the access E-PHB may be based on frame information in the Ethernet service frame related to any of the seven OSI layers. Common OSI layer frame information may be determined from the p-bits in the IEEE 802.1Q tag or the IP DSCP fields. Other frame information may be used, such as information found in the Ethernet CFI field in the IEEE 802.1Q tag, the VLAN-ID, the Ethertype, the IP source and/or destination addresses, the IP protocol type, the TCP port number or the UDP port number.

The determination of the identity of the Bandwidth Profile to use at the policer 204 may be based on a per-UNI service class map which associates an Ethernet service class with an E-PSC and a bandwidth profile-ID. Different E-PSCs may be associated with the same or different bandwidth profile-ID, similar to the per-EVC example presented hereinbefore.

In one implementation, Ethernet service frames received over a given UNI are associated with the same Ethernet service class and are policed according to a single Bandwidth Profile.

In another implementation, each Ethernet service frame received over a given UNI may be associated with one of multiple Ethernet service classes but is policed according to a single Bandwidth Profile. The Ethernet service classes of the Ethernet service frames may be determined based on the p-bits, or DSCP, etc. Up to eight Ethernet service classes may be determined based on the p-bits, and up to 64 Ethernet service classes may be determined based on the DSCP.

In a further implementation, each Ethernet service frame received over a given UNI may be associated with one of multiple Ethernet service classes and is policed according to one of multiple Bandwidth Profiles. The Ethernet service classes of the Ethernet service frames may be determined based on the p-bits, or DSCP, etc. The Bandwidth Profile may be assigned based on a service class map (e.g., combining one or more p-bits or DSCPs). The number of Bandwidth Profiles can be the same or smaller than the number of the PSCs.

Figure 10:
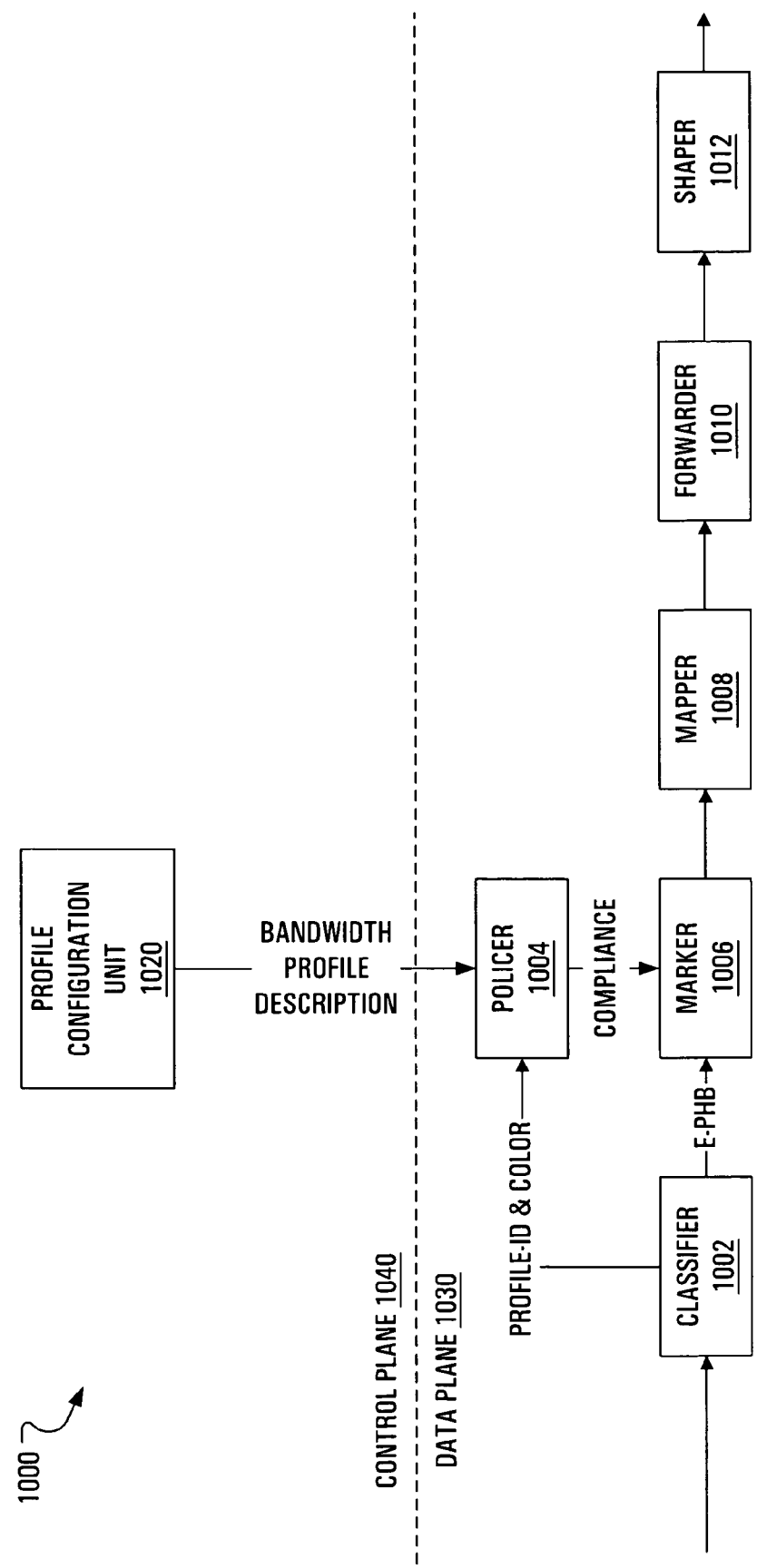
FIG. 10 illustrates a logical architecture for an egress traffic management system for provider edge equipment in the provider network of FIG. 1.

Thus far, only the ingress traffic management system 200 and the CE-PE direction has been considered. However, there may be reasons for performing traffic management functions at the egress PE in the PE-CE direction. An egress traffic management system 1000 is illustrated in FIG. 10 as divided into a control plane 1040 and a data plane 1030. The data plane 1030 includes many elements familiar from the data plane 230 of FIG. 2, including the classifier 202, the policer 204, the marker 206, the mapper 208 and the forwarder 210, and a new elements, namely, a shaper 1012. The control plane 1040 includes a policing configuration unit 1020. As will be apparent to a person of ordinary skill in the art, the elements of the egress traffic management system 1000 are intended to represent functions and an order of operations rather than physical entities.

In operation, the handling of an Ethernet service frame by the egress traffic management system 1000 (at, say, the second PE 104B) very closely parallels the handling of an Ethernet service frame by the ingress traffic management system 200 (at, say, the first PE 104A). The handling begins with the receipt of the Ethernet service frame from a node in a Metro Ethernet Network (including, say, the provider network 102 of FIG. 1). Traffic management information about the received Ethernet service frame may be determined by the classifier 1002. The traffic management information may include an Ethernet service class and an E-PHB (forwarding treatment), from which may be determined an E-PSC, an identity of a Bandwidth Profile and a color to associate with the Ethernet service frame. The classifier 1002 may then generate an indication of the identity of the Bandwidth Profile and forwarding treatment for reference by other elements of the egress traffic management system 1000. After processing by the elements of the egress traffic management system 1000, the Ethernet service frame is transmitted to customer edge equipment over a UNI by the forwarder 1008.

Similar to the case for the ingress traffic management system 200, the determining of the Ethernet service class for a given Ethernet service frame may be based on the identity of the user-network interface (UNI-ID) over which the given Ethernet service frame is to be transmitted or on the identity of an Ethernet virtual connection (EVC-ID) associated with the given Ethernet service frame. Alternatively, the Ethernet service class determination may be based on the EVC-ID or egress UNI-ID in combination with any of the OSI protocol layer information including the p-bits, IP DSCP and VLAN-ID, etc. Once the Ethernet service class is determined, many traffic management parameters may then be derived for the Ethernet service frame, such as a Bandwidth Profile, an E-PHB and an E-PSC.

The policer 1004 may determine whether the Ethernet service frame is compliant with the Bandwidth Profile. Subsequently, the marker 1006 may, where the Ethernet service frame is determined not to be compliant with the Bandwidth Profile, indicate a forwarding treatment for the Ethernet service frame that takes into account a lack of compliance. Ethernet service frames determined not to be compliant with the Bandwidth Profile may, instead, simply be dropped.

This application of compliance rules may be seen as particularly useful when applied based on the identity of the UNI or an Ethernet service class/QoS class associated with the identified UNI to limit the total volume incoming traffic from multiple sources when service multiplexing is employed (multiple EVCs per UNI).

A traffic shaping function may be seen to limit and smooth the traffic to the CE. Similar to policing, the traffic shaping function may be applied per UNI, per EVC, per UNI service class/QoS class or per EVC service class/QoS class. The applicants have found the traffic shaping function to be more beneficial per UNI (or UNI plus service class or QoS class) when service multiplexing is used to limit the traffic arriving from multiple EVCs.

The shaper 1012 may direct the Ethernet service frame to a queue such that, as the Ethernet service frame is transmitted from the queue as part of a flow of Ethernet service frames, the flow is limited to a predetermined rate.

The mapper 1016 may alter the header of the Ethernet service frame to suit requirements of the destination customer network that includes the third CE 106Y. In particular, altering the header may involve removing the core/tunnel header and/or altering user priority bits in an IEEE 802.1Q tag. The predetermined rate may be selected based on the identity of the UNI or the identity of an Ethernet virtual connection to associate with the Ethernet service frame.

Egress traffic management may provide an opportunity for translation between Ethernet service classes used in the provider network 102 and the destination customer network 108B. Where the received Ethernet service frame is associated with a first Ethernet service class, handling the Ethernet service frame may involve selecting an indication of a second service class from a set of indications to be used at the customer edge equipment and altering the Ethernet service frame to include the indication of the second service class. The indication of a service class may be understood to be the E-PHB, however marked on an Ethernet service frame. Such a translation may allow for a mapping of multiple E-PHBs in the provider network 102 to a fewer number of E-PHBs in the destination customer network 108B. Alternatively, such a translation may allow for a mapping, with some additional information, of a fewer number of E-PHBs in the provider network 102 to multiple E-PHBs in the destination customer network 108B.

The applicant has recognized a motivation for using multiple EVCs between a given source CE and a given destination CE, herein called an "EVC Group". The use of EVC Groups can have several benefits, by providing resiliency in case of failure and allowing for incremental growth.

In operation, a first EVC may be established between the first UNI 110XA and the second UNI 110YB. Subsequently, a second EVC may be established between the first UNI 110XA and the second UNI 110YB. A first EVC group may then be defined to include the first Ethernet virtual connection and the second Ethernet virtual connection. More particularly, the EVCs in the first EVC group may be configured to have the same performance characteristics (frame delay variation, frame delay, frame loss ratio).

The Bandwidth Profile may be specified per EVC Group, instead of per EVC, for scalability and simplicity. Furthermore, the EVCs in a given EVC Group may be configured to carry the same mix of service class traffic. In one example of this, the EVC group may be configured such that each EVC carries a predetermined mix of Gold, Silver and Bronze service class traffic. In another example, each EVC within a given EVC Group may be configured such that different service class types are carried on different EVCs, that is, the first EVC carries Gold traffic while the second EVC carries Silver and Bronze traffic. Each method may be shown to offer advantages in some networking scenarios, in terms of resiliency, sharing, cost, etc.

Load balancing techniques may be used when multiple EVCs can carry the incoming traffic, without introducing re-ordering of the frames within an Ethernet service class. A common technique attempts the equalization of the load of the various EVCs in an EVC Group, using maximum unreserved bandwidth as the optimization parameter. Another common technique attempts equalization of the percent utilization of each EVC.

In general, an EVC Group-ID may be determined for a received Ethernet service frame. An EVC may then be selected from among the plurality of EVCs in the EVC group so that the Ethernet service frame may be transmitted over the selected EVC. Once the EVC Group-ID has been established, a service class and a Bandwidth Profile may be determined. The selection of the EVC may be accomplished after determining an Ethernet service class for the received Ethernet service frame. In the event of a failure in one EVC in an EVC Group, the failed EVC may be excluded from being selected to accept traffic associated with the EVC Group-ID.

As indicated hereinbefore, the MEF has defined a point-to-point EVC as being configured to connect two UNIs. An "Aggregate EVC" is proposed herein, which includes multiple EVCs having common end points (PEs 104). Implementation of Aggregate EVCs may be seen to offer significant scalability in the provider network 102.

In an optional aspect of the Aggregate EVC, only the UNIs that belong to the same customer and terminate on the same PEs are configured to be part of a given Aggregate EVC. In this way, the Aggregate EVC is allowed to become a customer-visible entity, which opens a range of additional service offerings. For example, the bandwidth profile could be specified for the aggregate EVC, allowing the customer to share the bandwidth across set of UNIs. Aggregate EVCs also offer advantages under failure, since some of the UNIs could survive and continue to provide service.

The traffic in each EVC must be distinguishable at the egress device, in order to allow de-multiplexing of the Ethernet service frames onto the various UNIs. In a first example, the UNI MAC addresses are globally unique throughout the MEN. In a second example, a tunneling technology may be used in the provider network 102, which assigns a unique label to the frames belonging to each EVC.

In operation, an identity of an EVC is determined for a received Ethernet service frame. Subsequently, an identity of an aggregate Ethernet virtual connection is determined based on the identity of the Ethernet virtual connection, where the aggregate Ethernet virtual connection includes the first EVC. The Ethernet service frame is then transmitted over the EVC.

A set of compliance rules and the identity of a Bandwidth Profile to associate with the Ethernet service frame may be determined based on the identity of the aggregate Ethernet virtual connection. An indication of the set of compliance rules may then be generated for use by other family members.

Figure 11:
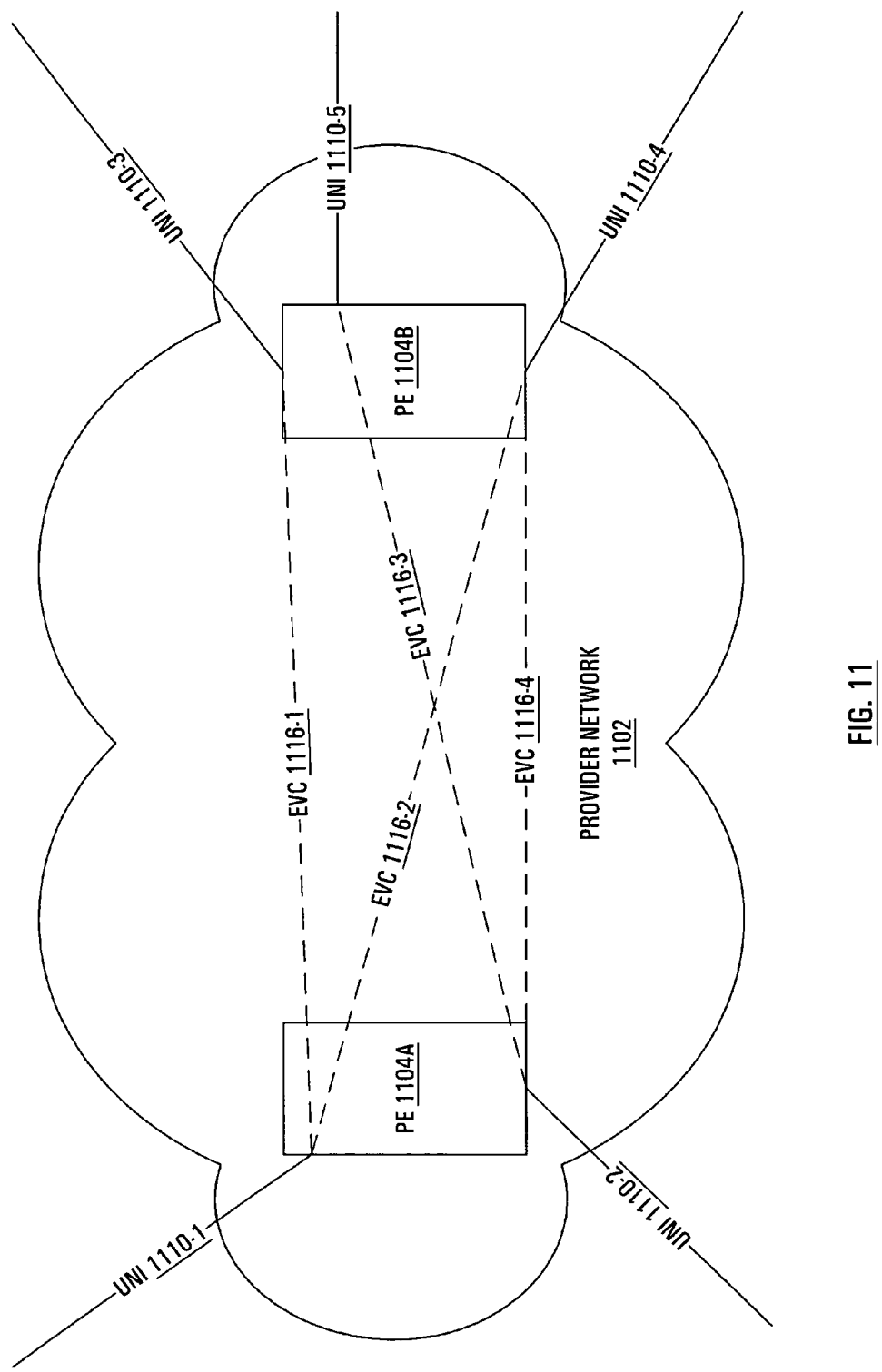
FIG. 11 illustrates a provider network supporting multiple Ethernet virtual connections between provider edge equipment according to an embodiment of the present invention.

FIG. 11 illustrates an exemplary network including a provider network 1102 that has multiple provider edges, two of which, a first PE 1104A and a second PE 1104B, are illustrated. Two UNIs connect to the first PE, namely a first UNI 1110-1 and a second UNI 1110-2 while three UNIs connect to the second PE 1104B, namely, a third UNI 1110-3, a fourth UNI 1110-4 and a fifth UNI 1110-5. Additionally, four EVCs are illustrated: a first EVC 1116-1, between the first UNI 1110-1 and the third UNI 1110-3; a second EVC 1116-2, between the first UNI 1110-1 and the fourth UNI 1110-4; a third EVC 1116-3, between the second UNI 1110-1 and the fifth UNI 1110-5; and a fourth EVC 1116-4, between the second UNI 1110-2 and the fourth UNI 1110-4. The EVCs may be referred to collectively or individually as 1110.

The four EVCs of FIG. 11 may be considered to be part of an Aggregate EVC (not explicitly shown). For added flexibility, the first PE 1104A and the second PE 1104B may be configured to perform service multiplexing, whereby Ethernet service frames that are part of different VLANs arriving on the same UNI are directed to different EVCs. Even further flexibility may be added where the third UNI 1110-3 and the fourth UNI 1110-5 are VLAN unaware. For network scalability, the Aggregate EVC may carry all four EVCs traffic together in the provider network core.

As before, the EVC traffic must be distinguishable at the edge, in order to allow de-multiplexing of the frames onto the various UNIs. For example, the UNI MAC addresses must be globally unique throughout the MEN. Or a tunneling technology may be used in the core, which assigns a unique label to the frames belonging to each EVC.

The use of Metro Ethernet Networks is not limited to a single service provider. As illustrated in a network 1200 in FIG. 12, two networks of a first service provider, namely an origin first provider network 1208A and a destination first provider network 1208B, are interposed by a second provider network 1202. The origin first provider network 1208A supports a first UNI 1210-1 and a second UNI 1210-2. The destination first provider network 1208B supports a third UNI 1210-3 and a fourth UNI 1210-4. The origin first provider network 1208A connects to a first PE 1204A in the second provider network 1202 over a first network-network interface (NNI) 1212A. The destination first provider network 1208B connects to a second PE 1204B in the second provider network 1202 over a second NNI 1212B.

Most functions described herein for use over a UNI between users and providers may be applied over a NNI between a first provider and a second provider, including classification, policing, marking, and forwarding. Furthermore, traffic management functions may be carried out per EVC, per UNI, per service class or QoS class, and may involve ingress and/or egress traffic management functions.

Figure 12:
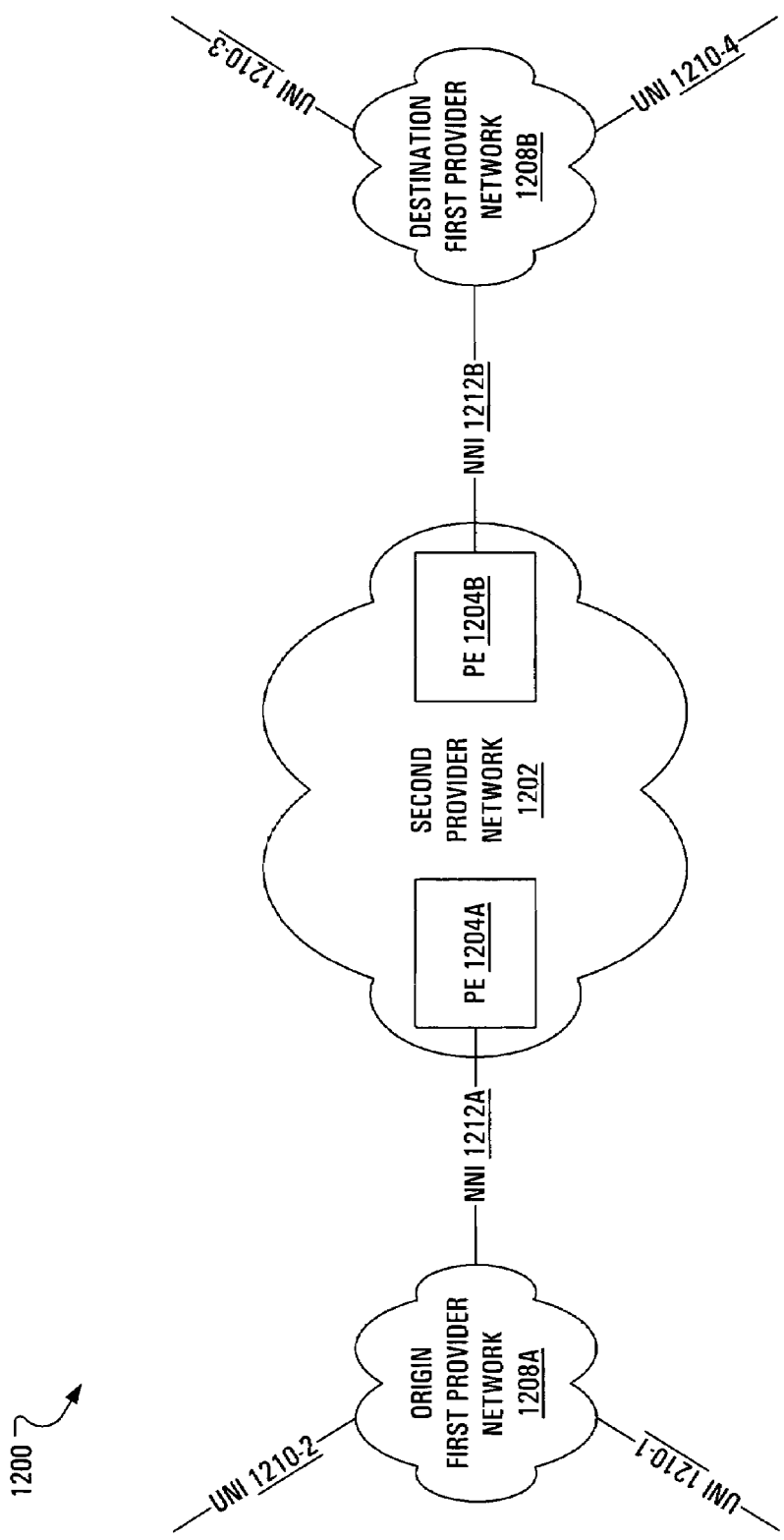
FIG. 12 illustrates two networks of a first service provider in communication over network-network interfaces with an interposed second provider network according to an embodiment of the present invention.

The Access-Core MENs model of FIG. 12 is very similar to the UNI model of FIG. 1. The second provider network 1202 of FIG. 12 acts as the provider network 102 of FIG. 1 and the origin first provider network 1208A acts as the origin customer network 108A of FIG. 1.

Traffic management parameters may be specified for the entire first NNI 1212A or per EVC within the second provider network 1202, and may be specified for single or multiple classes of service as described hereinbefore.

The traffic across the first NNI 1212A and the second NNI 1212B may include original connections (EVCs) and CE frames. More typically, the traffic across the NNI is aggregate traffic related to multiple end-users (CEs). Aggregation and Tunneling techniques may be used to multiplex/de-multiplex the end-users' traffic.

Figure 13:
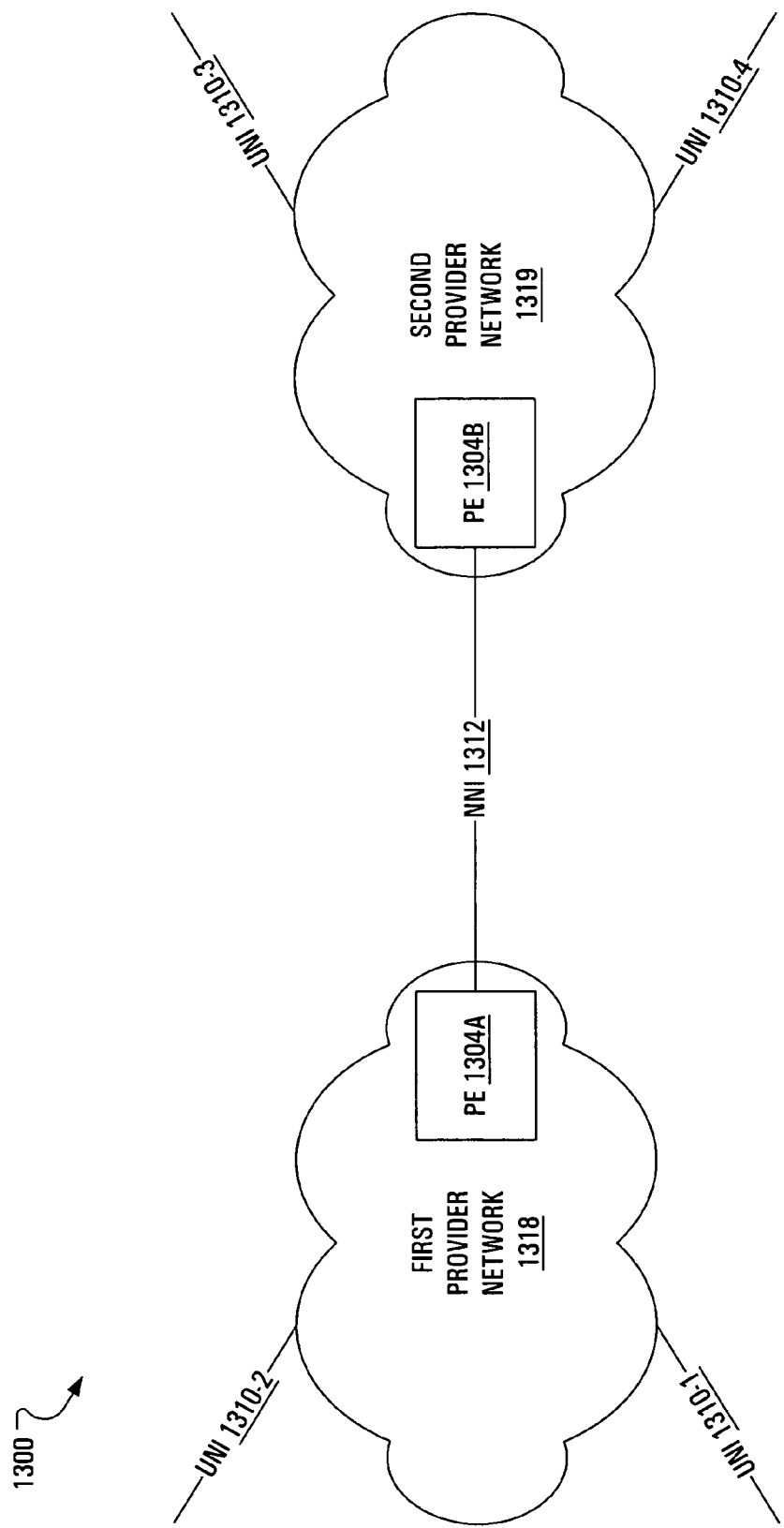
FIG. 13 illustrates two peer provider networks in communication over a network-network interface according to an embodiment of the present invention.

As illustrated in a network 1300 in FIG. 13, a first provider network 1318 including a first PE 1304A connects to a second provider network 1319 including a second PE 1304B over an NNI 1312. The first provider network 1318 supports a first UNI 1310-1 and a second UNI 1310-2. The second provider network 1319 supports a third UNI 1310-3 and a fourth UNI 1310-4.

In the peer-to-peer model of FIG. 13, the first provider network 1318 and the second provider network 1319 play roles at the NNI 1312 similar to the CE role and the provider network role at the UNI. For traffic in the direction from the first provider network 1318 to the second provider network 1319, the role of the PE 1304B in the second provider network 1319 of FIG. 13 is similar to role of the PE 104A in the provider network 102 of FIG. 1 described hereinbefore. The service parameters may be specified per access EVC, or, more commonly, per aggregate EVC carrying multiple end-customer EVCs for scalability and operations simplicity. The first PE 1304A may perform egress traffic management functions, which include traffic shaping for compliance to the traffic contract/policer of the second provider network 1319. The PE roles are reversed for traffic traveling in the direction from the second provider network 1319 to the first provider network 1318.

In operation, the second PE 1304B may receive an Ethernet service frame over the NNI 1312. A classifier may determine an Ethernet service class (or QoS class) for the Ethernet service frame, a policing function may be performed, and the frame may be marked to indicate a new forwarding treatment for the Ethernet service frame based on the Ethernet service class. The Ethernet service frame may then be transmitted to a node in the second provider network 1319.

We will now turn our attention to servicing the frame inside the provider core network. An EVC may be transported in the provider network 102 (FIG. 1) using different methods, depending on provider network technology and required QoS. In connection-oriented provider networks, such as ATM, Frame Relay, MPLS, TDM (optical or circuit switching), an EVC can be mapped to one or more provider network connections that support single or multiple service classes each. The EVC service class and Bandwidth Profiles may be mapped flexibly to connections in the provider network 102, using various aggregation and mapping methods.

In connectionless networks, such as IP, legacy Ethernet, MPLS LDP protocol, bandwidth reservation is not possible, but the Ethernet service class indicators of the Ethernet service frame can be mapped to IP DiffServ, p-bits, etc. for different forwarding treatment.

In operation, at the PE 104A of FIG. 1, an access service class may be determined for an Ethernet service frame received over the UNI 110XA. A provider network connection may be selected based on the determined access service class. The selecting may involve consulting a mapping of access service classes to provider network service classes. The Ethernet service frame may then be encapsulated in a protocol data unit used in the provider network 102. The header of the encapsulating protocol data unit may then be marked to include the determined provider network service class indication. Subsequently, the provider network protocol data unit may be transmitted on the provider network connection. Notably, the provider network connection may be configured to carry more than one EVC.

Typically, a tunneling technology is employed in the provider network 102, where a tunnel header is appended to each Ethernet service frame, and used for forwarding the Ethernet service frame in the provider network 102. Although not necessary, this method has several advantages, including independence between the customer networks 108 and the provider network 102, an ability to preserve the original Ethernet service frame header and service class indicators, and the ability of multiplexing many services and connections on the provider network 102 (for scalability and operations simplification).

Example tunneling techniques include Ethernet MAC-in-MAC or Q-in-Q, IETF PWE3 pseudo wires, MPLS label switched paths, IP tunnels, ATM and Frame Relay tunnels, etc. As will be understood, proprietary tunneling techniques may also be used.

At the classifier 202 of the ingress traffic management system 200 of FIG. 2, mapping a service class associated with a received Ethernet service frame to the corresponding service class indication in the provider network 102 may involve a simple 1:1 mapping when the customer network 108 and the provider network 102 support the same forwarding treatments. More often, mapping is needed to translate customer-specific service classes to the common service classes offered by the service provider. For example, the customer network 108 may use eight or more service classes to meet the enterprise needs, while the provider (or the service purchased from the provider) provides three or four service classes, such as Platinum, Gold, Silver and Bronze.

At the mapper 208, the encapsulating header of a given Ethernet service frame may be manipulated for efficient DiffServ-style forwarding within the provider network 102. Such manipulating may involve setting the Ethernet p-bits, MPLS EXP bits, or IP tunnel DSCP bits. Such manipulating may also include the setting of a discard priority and congestion indications in the encapsulating header.

At the forwarder 210, the Ethernet service frame may be forwarded onto the chosen connection or scheduling queue that meets the class performance objectives.

Other modifications will be apparent to those skilled in the art and, therefore, the invention is defined in the claims.

We claim:

1. A method of handling an Ethernet service frame in an Ethernet Network comprising:
   receiving an Ethernet service frame at provider edge network equipment;
   determining a marked forwarding treatment for said Ethernet service frame;
   assigning a new forwarding treatment to said Ethernet service frame based on said marked forwarding treatment;
   determining a color to associate with said Ethernet service frame based on said new forwarding treatment;
   generating an indication of said color;
   determining compliance of said Ethernet service frame with a Bandwidth Profile;
   generating an indication of said compliance of said Ethernet service frame with said Bandwidth Profile;
   determining, based on said indication of said compliance, that said Ethernet service frame does not comply with said Bandwidth Profile;
   responsive to said determining that said Ethernet service frame does not comply with said Bandwidth Profile, processing said Ethernet service frame based on said indication of said color;
   modifying a header of said Ethernet service frame to indicate said new forwarding treatment for said Ethernet service frame based on a service class and said indication of said compliance;

mapping said service class to a core forwarding treatment for use within a service provider network; and transmitting said Ethernet service frame to a node in said Ethernet network.

2. The method of claim 1 wherein said assigning comprises:

selecting a candidate marking map; and determining a correspondence in said candidate marking map between said marked forwarding treatment and said new forwarding treatment.

3. The method of claim 2 further comprising:

determining an identity of an Ethernet virtual connection to associate with said Ethernet service frame; and wherein said selecting said candidate marking map is based on said identity of said Ethernet virtual connection.

4. The method of claim 2 further comprising:

determining an identity of said user-network interface; and wherein said selecting said candidate marking map is based on said identity of said user-network interface.

5. The method of claim 1 further comprising:

determining, based on information in said header of said Ethernet service frame, said service class for said Ethernet service frame, where said service class is associated with said forwarding treatment for said Ethernet service frame.

6. The method of claim 5 further comprising determining an identity of an Ethernet virtual connection to associate with said Ethernet service frame.

7. The method of claim 6 further comprising determining an identity of said Bandwidth Profile to associate with said Ethernet service frame.

8. The method of claim 7 wherein said determining said identity of said Bandwidth Profile comprises:

selecting a service class map based on said identity of said Ethernet virtual connection, where said service class map associates scheduling treatments with Bandwidth Profile identities;

determining a scheduling treatment for said Ethernet service frame based on said service class; and determining said identity of said Bandwidth Profile based on an association, in said service class map, between said Bandwidth Profile and said scheduling treatment for said Ethernet service frame.

9. The method of claim 6 further comprising:

determining, from said information in said header, an identity of a virtual local area network with which said Ethernet service frame is associated; and wherein said determining said identity of said Ethernet virtual connection is based, at least in part, on said identity of said virtual local area network.

10. The method of claim 6 wherein said determining said identity of said Ethernet virtual connection is based, at least in part, on a port on which said Ethernet service frame is received.

11. The method of claim 6 wherein said determining said identity of said Ethernet virtual connection is based, at least in part, on a Medium Access Control address included in a header of said Ethernet service frame.

12. The method of claim 6 wherein said determining said service class is based, at least in part, on said identity of said Ethernet virtual connection.

13. The method of claim 6 wherein said service class is associated with performance targets for said Ethernet service frame.

14. The method of claim 6 wherein said service class is associated with a policing treatment for said Ethernet service frame.

15. The method of claim 5 wherein said determining said service class is based on information in said Ethernet service frame related to an Open System Interconnect layer.

16. The method of claim 15 wherein said information in said Ethernet service frame is located in a user priority field and said determining said service class is based, at least in part, on values of bits in said user priority field.

17. The method of claim 15 wherein said information in said Ethernet service frame related to said Open System Interconnect layer is an Internet Protocol Differentiated Services Code Point.

18. The method of claim 5 further comprising:

directing said Ethernet service frame to a queue; and transmitting said Ethernet service frame from said queue as part of a flow of Ethernet service frames, where said flow is limited to a predetermined rate.

19. The method of claim 5 wherein said node in said Ethernet network comprises customer edge equipment.

20. The method of claim 5 wherein said node in said Ethernet network comprises service provider equipment.

21. The method of claim 5 wherein said receiving said Ethernet service frame is performed over a user-network interface.

22. The method of claim 21 further comprising determining an identity of said user-network interface and basing said determining said service class for said Ethernet service frame on said identity of said user-network interface.

23. The method of claim 5 wherein said receiving said Ethernet service frame is performed over a network-network interface.

24. The method of claim 5 wherein said Ethernet service frame is received from a node in a service provider network.

25. The method of claim 1 wherein said determining said color is based on said information in said header of said Ethernet service frame.

26. The method of claim 1 wherein said forwarding treatment relates to treatment of said Ethernet service frame within said service provider network.

27. The method of claim 1 wherein said forwarding treatment relates to treatment of said Ethernet service frame within a customer network.

28. A hardware traffic management system in a provider edge node in an Ethernet Network comprising:

a classifier operable to:

receive an Ethernet service frame;

determine a marked forwarding treatment for said Ethernet service frame;

assign a new forwarding treatment to said Ethernet service frame based on said marked forwarding treatment;

determine a color to associate with said Ethernet service frame based on said new forwarding treatment; and generate an indication of said color;

a policer operable to:

determine that said Ethernet service frame does not comply with a Bandwidth Profile;

generate an indication of non-compliance of said Ethernet service frame with said Bandwidth Profile; and process said Ethernet service frame based on said indication of said color based on said indication of said non-compliance;

a marker operable to:

modify a header of sad Ethernet service frame to indicate said forwarding treatment for said Ethernet service frame based on a service class and said indication of said compliance;
a mapper operable to:
map said service class to a core forwarding treatment for use within a service provider network; and
a forwarder operable to
transmit said Ethernet service frame to a node in said Ethernet network.

29. The traffic management system of claim 28, wherein:
said classifier is operable to determine, based on information recorded in said header of said Ethernet service frame, said service class for said Ethernet service frame, where said service class is associated with said forwarding treatment for said Ethernet service frame.

30. The traffic management system of claim 29 wherein said classifier is further operable to determine an identity of an Ethernet virtual connection to associate with said Ethernet service frame.

31. The traffic management system of claim 30 wherein said service class is associated with performance targets for said Ethernet service frame.

32. The traffic management system of claim 30 wherein said service class is associated with a policing treatment for said Ethernet service frame.

33. The traffic management system of claim 30 wherein said classifier is further operable to determine an identity of said Bandwidth Profile to associate with said Ethernet service frame.

34. The traffic management system of claim 33 wherein said classifier is further operable to:
select a service class map based on said identity of said Ethernet virtual connection, where said service class map associates scheduling treatments with Bandwidth Profile identities;
determine a scheduling treatment for said Ethernet service frame based on said service class; and
determine said identity of said Bandwidth Profile based on an association, in said service class map, between said Bandwidth Profile and said scheduling treatment for said Ethernet service frame.

35. The traffic management system of claim 34 wherein said classifier is further operable to determine said identity of said Ethernet virtual connection based, at least in part, on a Medium Access Control address included in a header of said Ethernet service frame.

36. The traffic management system of claim 30 wherein said classifier is further operable to:
determine, from said information in said header, an identity of a virtual local area network with which said Ethernet service frame is associated; and
base said determining said identity of said Ethernet virtual connection, at least in part, on said identity of said virtual local area network.

37. The traffic management system of claim 30 wherein said classifier is further operable to determine said identity of said Ethernet virtual connection based, at least in part, on a port on which said Ethernet service frame is received.

38. The traffic management system of claim 30 wherein said classifier is further operable to determine said service class based, at least in part, on said identity of said Ethernet virtual connection.

39. The traffic management system of claim 29 wherein said classifier is further operable to determine said service class based on information in said Ethernet service frame related to an Open System Interconnect layer.

40. The traffic management system of claim 39 wherein said information in said Ethernet service frame is located in a user priority field and said classifier is further operable to determine said service class based, at least in part, on values of bits in said user priority field.

41. The traffic management system of claim 39 wherein said information in said Ethernet service frame related to said Open System Interconnect layer is an Internet Protocol Differentiated Services Code Point.

42. The traffic management system of claim 29 wherein said forwarder is further operable to:
direct said Ethernet service frame to a queue; and
transmit said Ethernet service frame from said queue as part of a flow of Ethernet service frames, where said flow is limited to a predetermined rate.

43. The traffic management system of claim 29 wherein said node in said Ethernet network comprises customer edge equipment.

44. The traffic management system of claim 29 wherein said node in said Ethernet network comprises service provider equipment.

45. The traffic management system of claim 29 wherein said classifier is further operable to receive said Ethernet service frame over a user-network interface.

46. The traffic management system of claim 45 wherein said classifier is further operable to determine an identity of said user-network interface and to determine said service class for said Ethernet service frame based on said identity of said user-network interface.

47. The traffic management system of claim 29 wherein said classifier is further operable to receive said Ethernet service frame over a network-network interface.

48. The traffic management system of claim 29 wherein said classifier is further operable to receive said Ethernet service frame from a node in a service provider network.

49. The traffic management system of claim 28 wherein said forwarding treatment relates to treatment of said Ethernet service frame within said service provider network.

50. The traffic management system of claim 28 wherein said forwarding treatment relates to treatment of said Ethernet service frame within a customer network.

51. The traffic management system of claim 28 wherein said mapper is further operable to select a connection, within said service provider network, on which to transmit said Ethernet service frame, based on said core forwarding treatment.

52. The traffic management system of claim 28 wherein said classifier is further operable to determine said color based on said information in said header of said Ethernet service frame.

53. The traffic management system of claim 28 wherein said classifier is further operable to:
select a candidate marking map; and
determine a correspondence in said candidate marking map between said marked forwarding treatment and said new forwarding treatment.

54. The traffic management system of claim 53 wherein said classifier is further operable to:
determine an identity of an Ethernet virtual connection to associate with said Ethernet service frame; and
base said selecting said candidate marking map on said identity of said Ethernet virtual connection.

55. The traffic management system of claim 53 wherein said classifier is further operable to:
determine an identity of a user-network interface; and
base said selecting said candidate marking map on said identity of said user-network interface.

56. A non-transitory medium containing computer-executable instructions which, when performed by processor in provider edge network equipment in an Ethernet Network, cause the processor to:
- receive an Ethernet service frame;
- determine a marked forwarding treatment for said Ethernet service frame;
- assign a new forwarding treatment to said Ethernet service frame based on said marked forwarding treatment;
- determine a color to associate with said Ethernet service frame based on said new forwarding treatment; and
- generate an indication of said color;
- determine compliance of said Ethernet service frame with a Bandwidth Profile;
- generate an indication of said compliance of said Ethernet service frame with said Bandwidth Profile;
- determine, based on said indication of said compliance, that said Ethernet service frame does not comply with said Bandwidth Profile;
- process said Ethernet service frame based on said indication of said color responsive to said determining that said Ethernet service frame does not comply with said Bandwidth Profile;
- modify a header of sad Ethernet service frame to indicate said forwarding treatment for said Ethernet service frame based on the service class and said indication of said compliance;
- map said service class to a core forwarding treatment for use within a service provider network; and
- transmit said Ethernet service frame to a node in said Ethernet network.

57. The non-transitory medium of claim 56, wherein said computer-executable instructions further cause the processor to:
- determine, based on information recorded in said header of said Ethernet service frame, said service class for said Ethernet service frame, where said service class is associated with said forwarding treatment for said Ethernet service frame.

58. The non-transitory medium of claim 57 wherein said computer-executable instructions further cause the processor to determine an identity of an Ethernet virtual connection to associate with said Ethernet service frame.

59. The non-transitory medium of claim 58 wherein said service class is associated with performance targets for said Ethernet service frame.

60. The non-transitory medium of claim 59 wherein said computer-executable instructions further cause the processor to determine an identity of said Bandwidth Profile to associate with said Ethernet service frame.

61. The non-transitory medium of claim 60 wherein said computer-executable instructions further cause the processor to:
- select a service class map based on said identity of said Ethernet virtual connection, where said service class map associates scheduling treatments with Bandwidth Profile identities;
- determine a scheduling treatment for said Ethernet service frame based on said service class; and
- determine said identity of said Bandwidth Profile based on an association, in said service class map, between said Bandwidth Profile and said scheduling treatment for said Ethernet service frame.

62. The non-transitory medium of claim 58 wherein said service class is associated with a policing treatment for said Ethernet service frame.

63. The non-transitory medium of claim 58 wherein said computer-executable instructions further cause the processor to:
- determine, from said information in said header, an identity of a virtual local area network with which said Ethernet service frame is associated; and
- base said determining said identity of said Ethernet virtual connection, at least in part, on said identity of said virtual local area network.

64. The non-transitory medium of claim 58 wherein said computer-executable instructions further cause the processor to determine said identity of said Ethernet virtual connection based, at least in part, on a port on which said Ethernet service frame is received.

65. The non-transitory medium of claim 58 wherein said computer-executable instructions further cause the processor to determine said identity of said Ethernet virtual connection based, at least in part, on a Medium Access Control address included in a header of said Ethernet service frame.

66. The non-transitory medium of claim 58 wherein said computer-executable instructions further cause the processor to determine said service class based, at least in part, on said identity of said Ethernet virtual connection.

67. The non-transitory medium of claim 57 wherein said computer-executable instructions further cause the processor to determine said service class based on information in said Ethernet service frame related to an Open System Interconnect layer.

68. The non-transitory medium of claim 67 wherein said information in said Ethernet service frame is located in a user priority field and said classifier is further operable to determine said service class based, at least in part, on values of bits in said user priority field.

69. The non-transitory medium of claim 67 wherein said information in said Ethernet service frame related to said Open System Interconnect layer is an Internet Protocol Differentiated Services Code Point.

70. The non-transitory medium of claim 57 wherein said computer-executable instructions further cause the processor to:
- direct said Ethernet service frame to a queue; and
- transmit said Ethernet service frame from said queue as part of a flow of Ethernet service frames, where said flow is limited to a predetermined rate.

71. The non-transitory medium of claim 57 wherein said node in said Ethernet network comprises customer edge equipment.

72. The non-transitory medium of claim 57 wherein said node in said Ethernet network comprises service provider equipment.

73. The non-transitory medium of claim 57 wherein said computer-executable instructions further cause the processor to receive said Ethernet service frame over a user-network interface.

74. The non-transitory medium of claim 73 wherein said computer-executable instructions further cause the processor to determine an identity of said user-network interface and to determine said service class for said Ethernet service frame based on said identity of said user-network interface.

75. The non-transitory medium of claim 57 wherein said computer-executable instructions further cause the processor to receive said Ethernet service frame over a network-network interface.

76. The non-transitory medium of claim 57 wherein said computer-executable instructions further cause the processor to receive said Ethernet service frame from a node in a service provider network.

77. The non-transitory medium of claim 56 wherein said forwarding treatment relates to treatment of said Ethernet service frame within said service provider network.

78. The non-transitory medium of claim 56 wherein said forwarding treatment relates to treatment of said Ethernet service frame within a customer network.

79. The non-transitory medium of claim 56 wherein said computer-executable instructions further cause the processor to select a connection, within said service provider network, on which to transmit said Ethernet service frame, based on said core forwarding treatment.

80. The non-transitory medium of claim 56 wherein said computer-executable instructions further cause the processor to determine said color based on said information in said header of said Ethernet service frame.

81. The non-transitory medium of claim 56 wherein said computer-executable instructions further cause the processor to:
   select a candidate marking map; and
   determine a correspondence in said candidate marking map between said marked forwarding treatment and said new forwarding treatment.

82. The non-transitory medium of claim 81 wherein said computer-executable instructions further cause the processor to:
   determine an identity of an Ethernet virtual connection to associate with said Ethernet service frame; and
   base said selecting said candidate marking map on said identity of said Ethernet virtual connection.

83. The non-transitory medium of claim 81 wherein said computer-executable instructions further cause the processor to:
   determine an identity of a user-network interface; and
   base said selecting said candidate marking map on said identity of said user-network interface.

* * * * *